United States Patent [19]
Eastwood

[11] 3,886,815
[45] June 3, 1975

[54] MULTI-SPEED REVERSIBLE GEARING

[75] Inventor: Thomas Eastwood, Huddersfield, England

[73] Assignee: David Brown Tractors Limited, Meltham, Huddersfield, England

[22] Filed: Apr. 29, 1974

[21] Appl. No.: 464,952

[30] Foreign Application Priority Data
May 18, 1973 United Kingdom............... 23696/73

[52] U.S. Cl.................................... 74/745; 74/360
[51] Int. Cl............................................. F16h 3/02
[58] Field of Search ............ 74/745, 344, 360, 369, 74/375

[56] References Cited
UNITED STATES PATENTS

| | | | |
|---|---|---|---|
| 2,804,780 | 9/1957 | Gerst .................................. | 74/360 |
| 2,953,943 | 9/1960 | Arnold............................. | 74/360 X |
| 3,364,793 | 1/1968 | Eastwood............................ | 74/745 |

FOREIGN PATENTS OR APPLICATIONS

| | | | |
|---|---|---|---|
| 569,437 | 1/1959 | Canada................................ | 74/360 |

Primary Examiner—Benjamin W. Wyche
Attorney, Agent, or Firm—Norris & Bateman

[57] ABSTRACT

A gearbox for an agricultural tractor comprises forward and reverse gearing connecting an input shaft to a co-axial intermediate shaft, dual-range gearing connecting the intermediate shaft to a layshaft, and 4-speed gearing connecting the layshaft to an output shaft and utilising those of the dual-range gears disposed on the layshaft. The foward and reverse gearing includes a synchromesh clutch, and the 4-speed gearing includes a synchromesh clutch for the highest and the next highest of its speed ratios and a dog clutch for the lowest and the next lowest of its speed ratios. The dual-range gearing includes a cluster of two gears slideable on the intermediate shaft. A power take-off shaft passes through the input and intermediate shafts which are formed as sleeves.

5 Claims, 4 Drawing Figures

MULTI-SPEED REVERSIBLE GEARING

BACKGROUND OF INVENTION

This invention relates to gearboxes, particularly but not exclusively for agricultural tractors.

SUMMARY OF INVENTION

According to the invention, a gearbox comprises forward and reverse gearing including a synchromesh clutch and connecting an input shaft to an intermediate shaft, multi-range gearing connecting the intermediate shaft to a layshaft, and variable-speed gearing connecting the layshaft to an output shaft.

BRIEF DESCRIPTION OF DRAWINGS

A preferred embodiment of the invention will now be described, by way of example only, with reference to the accompanying drawings of which.

DESCRIPTION OF PREFERRED EMBODIMENT

Figure 1:
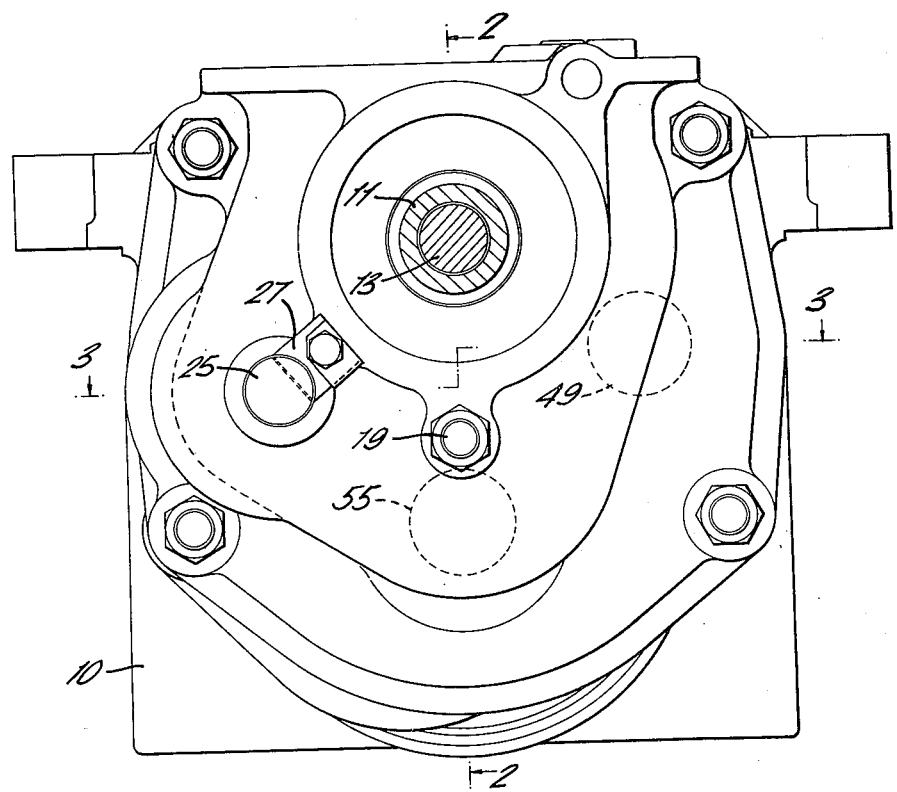
FIG. 1 is a front elevation of a gearbox for an agricultural tractor.
Figure 2:
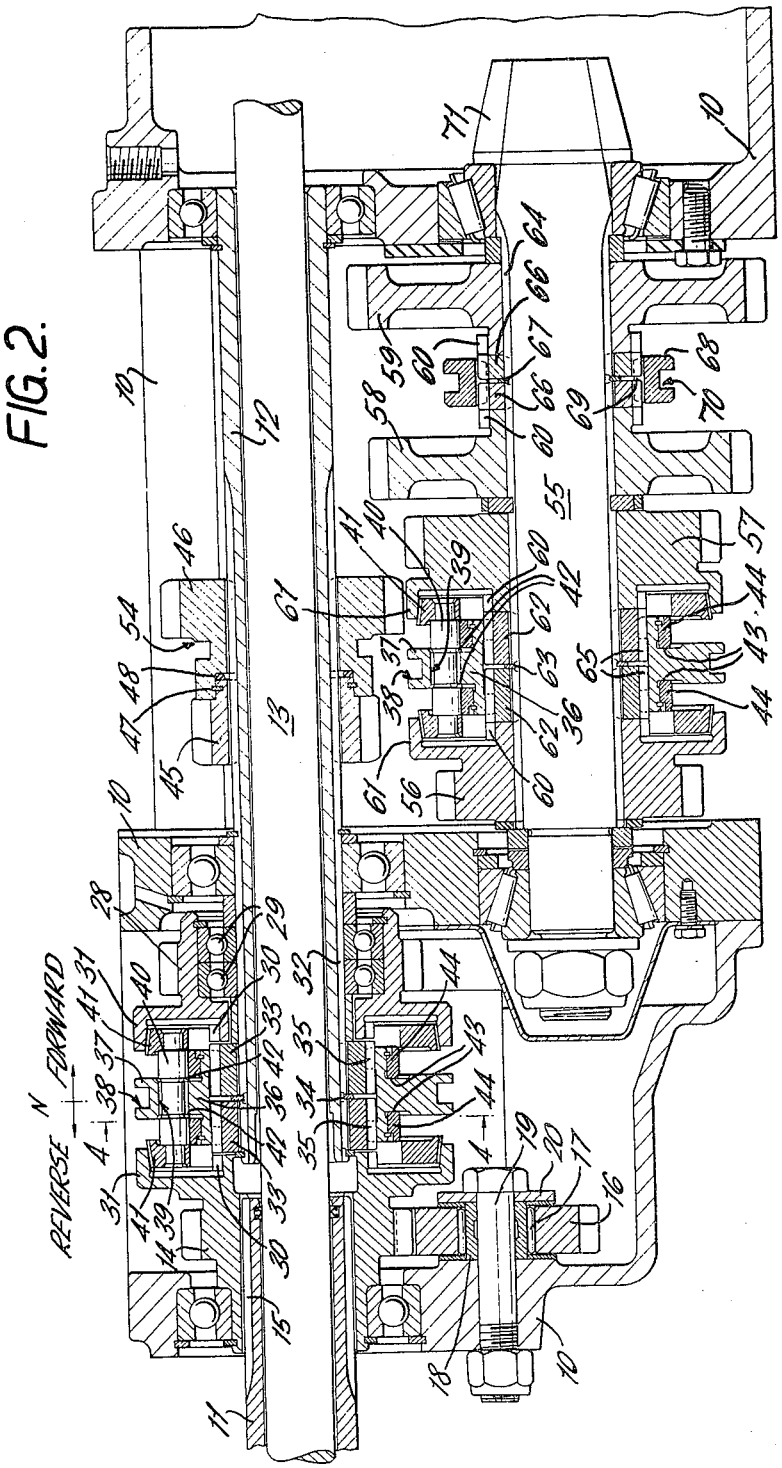
FIG. 2 is a section on the line 2—2 in FIG 1.
Figure 3:
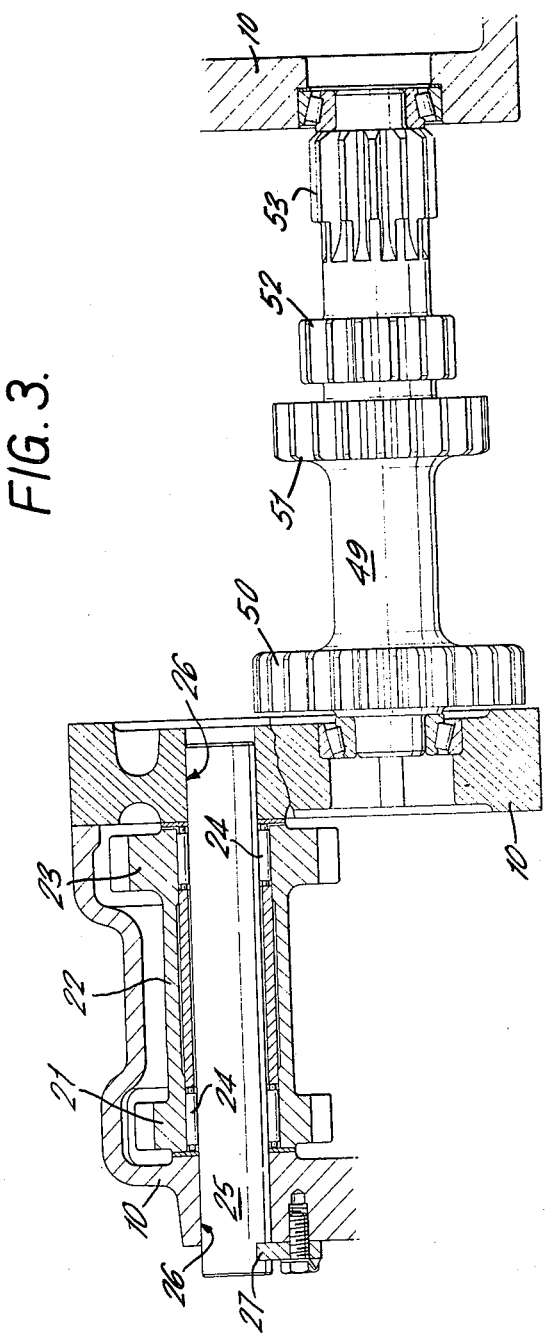
FIG. 3 is a section on the line 3—3 in FIG. 1.
Figure 4:
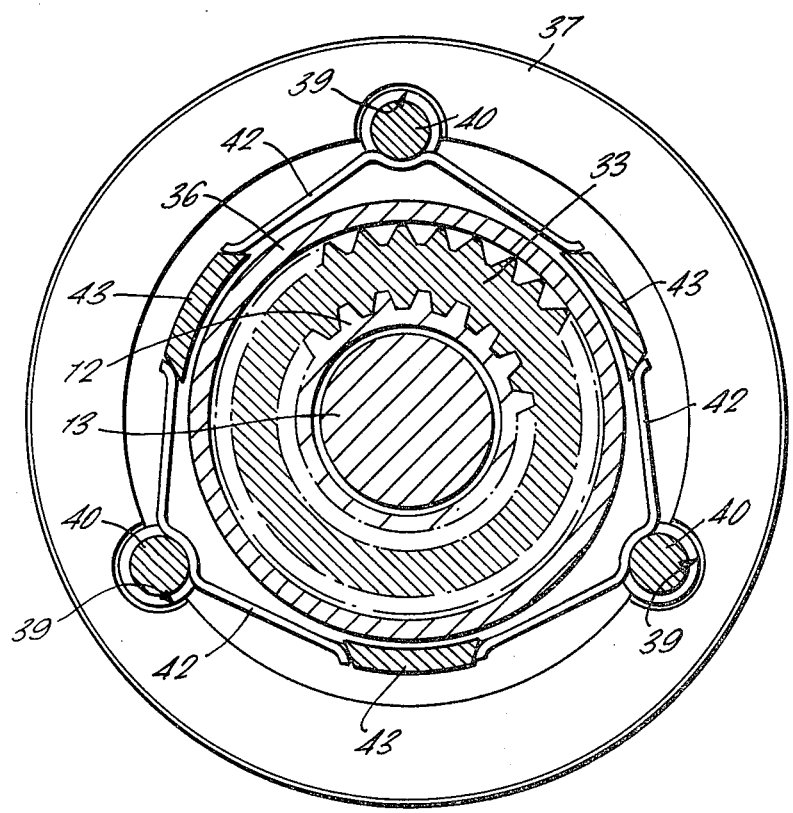
FIG. 4 is a section of a detail on the line 4—4 in FIG. 2.

Referring now to the drawings, a gearbox for an agricultural tractor includes a casing 10 in which there is journalled an input shaft 11 in the form of a sleeve one end of which is adjacent to one end of an intermediate shaft 12 also formed as a sleeve and journalled in the casing. The shafts 11 and 12 are co-axial, and surround a long independently rotatable power take-off shaft 13. A gear 14 mounted on splines 15 at said end of the input shaft 11 meshes constantly with an idler gear 16 rotatably mounted on a needle bearing 17 on a dead shaft consisting of a short sleeve 18 secured to the casing by a bolt 19 and a washer 20. The idler gear 16 meshes constantly with a gear 21 formed integrally on a tubular reverse shaft 22 on which another gear 23 is also formed integrally. The reverse shaft 22 is rotatably mounted on needle bearings 24 on a dead shaft 25 secured in aligned bores 26 in the casing 10 by a detent 27. The other gear 23 on the reverse shaft 22 meshes constantly with a gear 28 rotatably mounted on ball bearings 29 adjacent to that end of the intermediate shaft 12 which is adjacent to the input shaft 11. The gear 28 and the gear 14 each has formed integrally on it a set of external dog clutch teeth 30 and a female synchromesh clutch cone 31, and mounted on splines 32 at that end of the intermediate shaft 12 which is adjacent to the input shaft 11, between the gears 14 and 28, there are two hubs 33 separated by a circlip 34 to prevent the transmission of any axial thrust, and each having external clutch teeth 35 like those on said gears. A synchromesh clutch assembly according to our U.S. Pat. No. 3,695,403 includes an internally toothed clutch sleeve 36 having a central flange 37 in which there are formed an annular groove 38 and three equally circumferentially spaced chamfered holes 39. A pin 40, having a central portion of reduced diameter with chamfered ends, passes through each of the holes 39, and the three pins 40 rigidly connect together two male synchromesh clutch cones 41. Two sets of three springs 42, the ends of which abut against three equally circumferentially spaced axial projections 43 on rings 44, act to centralise the pins 40 axially and longitudinally of the holes 39. A selector fork (not shown) engaging in the groove 38 can slide the clutch sleeve 36 along the hubs 33 to either side of a neutral position. Initial movement of said sleeve carries the pins 40 and the male clutch cones 41 with it due to the action of the springs 42, but when one of said cones engages the associated female clutch cone 31 the torque exerted by the latter moves the pins 40 temporarily off-centre relative to the axis of the holes 39 to prevent further movement of the clutch sleeve 36 and thus to baulk premature engagement of the dog clutch teeth until synchronisation has been effected, whereupon the pins 40 are re-centred axially by the springs 42 and the clutch sleeve 36 can then slide along the pins 40, after depressing one set of the springs 42, to engage its clutch teeth with the clutch teeth 30 on one or the other of the gears 14 and 28. Thus the intermediate shaft 12 can be driveably connected directly to the gear 14 on the input shaft 11 so that both of said shafts rotate at the same speed and in the same direction, or the intermediate shaft 12 can be driveably connected to the gear 28 rotatably mounted thereon so that said shaft is driven by way of the idler gear 16 and the gears 21 and 23 on the reverse shaft 22 in the opposite direction to the input shaft 11.

Slideably mounted on the splines 32 on the intermediate shaft 12 are two gears 45 and 46 of mutually different pitch circle diameters secured together by a circlip 47 to form a cluster, an O-ring 48 being compressed between said gears to damp any tendency for them to move relative to one another. Formed integrally on a layshaft 49 which is journalled in the casing 10 parallel to the intermediate shaft 12 are four gears 50, 51, 52 and 53 the pitch circle diameters of which decrease progressively in a direction away from the input shaft 11. The arrangement is such that the cluster of two gears 45 and 46 on the intermediate shaft 12 is slideable along said shaft by a selector fork (not shown) engaging in an annular groove 54 in said cluster to bring that gear 45 of said cluster adjacent to the input shaft 11 into mesh with that gear 50 on the layshaft 49 having the largest pitch circle diameter, or alternatively to bring the other gear 46 of said cluster into mesh with that gear 51 on the layshaft 49 having the second largest pitch circle diameter. Thus the layshaft 49 can be driven in either of two different speed ranges relative to the intermediate shaft 12.

An output shaft 55 is journalled in the casing 10 parallel to the layshaft 49 and has four gears 56, 57, 58 and 59 rotatably mounted on it each of which meshes constantly with one of the gears 50, 51, 52 and 53 on the layshaft 49 to constitute variable-speed gearing. Each of the four gears 56, 57, 58 and 59 on the output shaft 55 has a set of external dog clutch teeth 60 formed integrally on it and each of those two 56 and 57 of said gears having smaller pitch circle diameters also has a female synchromesh clutch cone 61 formed integrally on it. Two hubs 62 separated by a circlip 63 are mounted on splines 64 on the output shaft 55 between those two 56 and 57 of the gears thereon having smaller pitch circle diameters, each of said hubs having external clutch teeth 65 like those on said two gears, and two similar hubs 66 separated by a circlip 67 are likewise mounted on the output shaft 55 between those two 58 and 59 of the gears thereon having larger pitch circle diameters. A synchromesh clutch assembly identical to that disposed between the gears 14 and 28, and having its parts indicated by the same reference numerals 36–44, is slideable on the hubs 62 between the gears 56 and 57, by a selector fork (not shown) engaging in the annular groove 38 in said assembly, to either side of a neutral position for engagement initially with the clutch cone 61 and ultimately with the clutch teeth 60 on either of the gears 56 and 57. A clutch sleeve 68 having internal dog clutch teeth 69 is slideable on the hubs 66 between the gears 58 and 59, by a selector fork (not shown) engaging in an annular groove 70 in said sleeve, to either side of a neutral position for engagement with the clutch teeth 60 on either of said gears. Thus the output shaft 55 can be driven by the layshaft 49 at any one of four different speed ratios. That end of the output shaft 55 remote from the input shaft 11 has formed integrally on it a bevel pinion 71 adapted to mesh with a bevel wheel (not shown) for driving the rear axle half-shafts of the tractor via conventional differential gearing.

The various selector forks are operable by selector rods actuated in well known manner by gear shift levers.

In operation, any one of the available power paths through the gearbox is selected by appropriate manipulation of the gear shift levers, a total of eight forward and eight reverse speed ratios being obtainable. The provision of the two synchromesh clutch assemblies facilitates changing from forward to reverse drive and from the highest to the next highest, or vice versa, of the four speed ratios obtainable from the variable-speed gearing.

I claim:

1. A gearbox comprising forward and reverse gearing including a synchromesh clutch and connecting an input shaft to an intermediate shaft; multi-range gearing connecting the intermediate shaft to a layshaft parallel to the intermediate shaft, said multi-range gearing comprising a cluster of two gears of mutually different pitch circle diameters slideable on splines on the intermediate shaft so that one of said gears can be brought into mesh with one gear secured on or integral with the layshaft or alternatively the other of said gears can be brought into mesh with another gear secured on or integral with the layshaft; and variable-speed gearing connecting the layshaft to an output shaft parallel to the layshaft and comprising a plurality of gears of mutually different pitch circle diameters secured on or integral with the layshaft and consisting of or including those gears on said shaft forming part of the multi-range gearing gears rotatably mounted on the output shaft and each meshing constantly with one of the gears on the layshaft, and clutch means for selectively connecting one of the gears rotatably mounted on the output shaft driveably to said shaft.

2. A gearbox according to claim 1, wherein the input and intermediate shafts are co-axial and the forward and reverse gearing comprises a gear secured on or integral with the input shaft and meshing constantly with an idler gear which meshes constantly with one gear secured on or integral with a reverse shaft parallel to the input and intermediate shafts, and another gear also secured on or integral with the reverse shaft and meshing constantly with a gear rotatably mounted on the intermediate shaft, and the synchromesh clutch is adapted to connect the gear rotatably mounted on the intermediate shaft driveably to said shaft or to connect driveably together the input and intermediate shafts.

3. A gearbox according to claim 2, wherein the input and intermediate shafts are sleeves surrounding an independently rotatable power take-off shaft.

4. A gearbox according to claim 1 wherein the cluster comprises two separately produced gears secured together by a circlip or the like with an O-ring or the like compressed between them.

5. A gearbox according to claim 1 wherein there are four gears on the output shaft and the clutch means for selectively connecting one of said gears driveably to said shaft comprise a synchromesh clutch for selectively connecting either of those two of said gears having smaller pitch circle diameters to said shaft and a dog clutch for selectively connecting either of those two of said gears having larger pitch circle diameters to said shaft.

* * * * *